(12) United States Patent
Park

(10) Patent No.: US 8,825,211 B2
(45) Date of Patent: Sep. 2, 2014

(54) AUTOMATED STEERING WHEEL LEVELING SYSTEM AND METHOD

(75) Inventor: Ji Hoon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 738 days.

(21) Appl. No.: 13/075,581

(22) Filed: Mar. 30, 2011

(65) Prior Publication Data

US 2012/0143373 A1    Jun. 7, 2012

(30) Foreign Application Priority Data

Dec. 1, 2010    (KR) .................. 10-2010-0121095

(51) Int. Cl.
| | | |
|---|---|---|
| G05B 19/04 | (2006.01) | |
| G05B 15/00 | (2006.01) | |
| G05B 19/00 | (2006.01) | |
| G01M 17/00 | (2006.01) | |
| G06F 7/00 | (2006.01) | |
| G06F 19/00 | (2011.01) | |

(52) U.S. Cl.
USPC ........... 700/259; 700/253; 700/254; 700/258; 901/2; 901/41; 901/46; 901/47; 701/33.1; 701/33.4

(58) Field of Classification Search
CPC ...... G01B 11/272; G01B 11/27; G01B 11/26; G01B 7/315; G01B 11/275; G01B 11/2755; G01B 21/26; G01B 2210/00–2210/16; G01B 2210/26–2210/286; G01B 5/24; G01B 5/0025; G01B 5/00255; B62D 1/046; B62D 1/06; B62D 6/10; B62D 1/08; G01L 5/221; G01L 3/26; G01M 17/00; G06F 19/00
USPC .......... 700/253, 254, 258, 259, 57, 59; 901/2, 901/19, 21–24, 36–38, 41, 46–47; 318/518.16, 568.21; 701/33.1, 34.4; 33/600; 382/153
See application file for complete search history.

(56) References Cited

U.S. PATENT DOCUMENTS 5,105,546 A * 4/1992 Weise et al. ................ 33/203.12
5,291,964 A * 3/1994 Groenenboom .............. 180/422

(Continued)

FOREIGN PATENT DOCUMENTS

| JP | 2006335139 A | 12/2006 |
|---|---|---|
| JP | 2007168723 A | 7/2007 |

OTHER PUBLICATIONS

RobotDrivesLiftTruck.pdf (Hitoshi Hasunuma, Masami Kobayashi, Hisashi Moriyama, Toshiyuki Itoko, Yoshitaka Yanagihara, Taka0 Uent, Kazuhisa Ohya, and Kazuhito Yokoi, A Tele-operated Humanoid Robot Drives a Lift Truck, May 2002, Proceedings of the 2002 IEEE, 2246-2252).*

*Primary Examiner* — Khoi Tran
*Assistant Examiner* — Bao Long T Nguyen
(74) *Attorney, Agent, or Firm* — Edwards Wildman Palmer LLP; Peter F. Corless

(57) ABSTRACT

The present invention provides an automated steering wheel leveling system and method. Particularly, the automated steering wheel leveling system includes a machine vision, a plurality of motor cylinders, a motor, and a robot, each operated by a process PC. The machine vision photographs a steering wheel to obtain position information of the steering wheel and determines a stroke of a motor cylinder and a grip position of a gripper using the position information. The plurality of motor cylinders move a plurality of grippers to steering wheel to secure the steering wheel. The motor rotates the steering wheel in order to adjust a zero-point of the steering wheel. The robot then moves the machine vision, the motor cylinder, and the motor to the steering wheel to align a shaft of the servo motor with a shaft of the steering wheel.

11 Claims, 9 Drawing Sheets

(56) References Cited

U.S. PATENT DOCUMENTS

| | | | | |
|---|---|---|---|---|
| 5,855,072 A * | 1/1999 | Nakaho | | 33/1 PT |
| 5,919,238 A * | 7/1999 | Lavey | | 701/34.4 |
| 5,943,783 A * | 8/1999 | Jackson | | 33/288 |
| 7,069,660 B2 * | 7/2006 | Robb et al. | | 33/203.16 |
| 7,318,287 B1 * | 1/2008 | Hatfield et al. | | 33/666 |
| 7,681,322 B1 * | 3/2010 | Pruitt et al. | | 33/203.18 |
| 7,698,031 B2 * | 4/2010 | Stevenson | | 701/33.9 |
| 7,710,555 B2 * | 5/2010 | Hoenke et al. | | 356/155 |
| 8,032,279 B2 * | 10/2011 | Rogers et al. | | 701/36 |
| 8,099,215 B2 * | 1/2012 | Kuramori | | 701/41 |
| 8,103,410 B2 * | 1/2012 | Hatano et al. | | 701/41 |
| 8,565,974 B2 * | 10/2013 | Kojo et al. | | 701/41 |
| 2007/0095122 A1 * | 5/2007 | Voeller | | 73/1.08 |
| 2008/0009974 A1 * | 1/2008 | Kong et al. | | 700/258 |
| 2012/0144895 A1 * | 6/2012 | Maschmann et al. | | 73/1.79 |
| 2013/0288560 A1 * | 10/2013 | Abou-Hamda | | 446/175 |

* cited by examiner (A): MACHINE VISION: POSITION MEASUREMENT & POSITION CORRECTION  (B): GRIPPER: SECURE STEERING WHEEL (D): SERVO MOTOR: ZERO-POINT CALIBRATION  (C): PROCESS PC: VERIFY ZERO-POINT

AUTOMATED STEERING WHEEL LEVELING SYSTEM AND METHOD

CROSS-REFERENCE TO RELATED APPLICATION

This application claims under 35 U.S.C. §119(a) the benefit of Korean Patent Application No. 10-2010-0121095 filed Dec. 1, 2010, the entire contents of which are incorporated herein by reference.

BACKGROUND (a) Technical Field

The present invention relates to an automated steering wheel leveling system and method. More particularly, the present invention relates to an automated steering wheel leveling system and method, which is configured to adjust the zero-point of a steering wheel with a certain level of particularity.

(b) Background Art

In general, when operations are performed using a toe, a camber, and so forth in a wheel alignment process of a vehicle, a steering wheel leveling apparatus is needed to exactly mount a steering wheel as a pre-process.

If the wheel alignment process is completed in a state where the angle of the steering wheel is not set to 0 degree, a leaning of a vehicle may occur due to a wheel offset defect.

FIG. 1 is a perspective view illustrating a steering wheel leveling apparatus which has been used in related art. The steering wheel leveling apparatus, shown in FIG. 1, includes a main body 1 having a monitor for zero-point calibration of the steering wheel, a glass adherence portion 2 to which a rubber packing withdrawn from the inside of the main body 1 adheres, and a supporting stand 3 having a supporting portion 5 at the end portion thereof. Specifically, the main body 1 fixed on the steering wheel using the supporting portion 5. The steering wheel leveling apparatus, shown FIG. 1 also has operation buttons 4 on the upper portion of the main body 1 to operate the glass adherence portion 2.

Operationally, the end portions of the supporting stand 3 are put on two places of the steering wheel, and the rubber packing of the glass adherence portion 2 is adhered to the front window glass of a vehicle to which the steering wheel is being installed. In doing so, the steering wheel leveling apparatus is supported by the supporting stand 3 and the glass adherence portion 2 at three points respectively.

The steering wheel leveling apparatus of Fig. then operates a zero-point calibration method which is illustrated in FIG. 2, and described below.

First, the end portion of a supporting stand 3 is placed on a steering wheel 10, as mentioned above. Then an operation button on the main body 1 is pushed to adhere to a rubber packing 6 of a glass adherence portion 2 to a front glass 7 of a vehicle. Accordingly, the steering wheel leveling apparatus is fixed on the steering wheel 10 and the front glass 7.

Next, an operator grips and finely moves the rubber packing 6 of the glass adherence portion 2 by using his hand to align the center of steering wheel 10 with the center of the vehicle through the zero-point setting.

For example, when the rubber packing 6 is turned in the right direction from the center of the vehicle, a plus digital value is displayed on a monitor 8 of a main body 1. On the other hand, when the rubber packing 6 is turned in the left direction of the center of the vehicle, a minus digital value is display on the monitor 8 of the main body 1. In this case, the operator finely adjust the rubber packing 6 while looking at the monitor 8 with the naked eye, and stops the rubber packing 6 to finish the zero-point calibration when the value displayed on the monitor 8 becomes zero, thereafter, completing the wheel alignment process.

One noted disadvantage of the apparatus shown in FIG. 1, however, is that whenever the rubber packing 6 adheres to the glass, the fixed position of the rubber packing 6 may vertically change according to the operators as described in FIG. 3. Thus, the measured value of the steering wheel leveling apparatus may change according to the fixed position of the rubber packing 6, but the zero-point of the steering wheel 10 may often be different.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an automated steering wheel leveling system which includes a machine vision configured to photograph a steering wheel in order to obtain position information of the steering wheel. Using this position information, a stroke of a motor cylinder and a grip position of a gripper can be determined. More specifically, a plurality of motor cylinders which have a gripper at the end portions thereof are used to secure the steering wheel. A servo motor is configured to rotate the steering wheel secured with the gripper in a manner which adjusts a steering wheel to a zero-point of the steering wheel. Additionally, a robot is coupled to a base bracket at an end portion thereof, to which the machine vision, the motor cylinder, and the servo motor are all coupled. The machine vision, the motor cylinder, and the servo motor are moved to the steering wheel to align a shaft of the servo motor with a shaft of the steering wheel. As a controlling mechanism, a process PC operates the machine vision, the servo motor, and the robot 11, respectively.

Furthermore, the base bracket may also include a central block disposed at a central portion thereof; a plurality of leg portions coupled to the central block at an upper end portion thereof which are increasingly spaced from each other closer to a lower end portion thereof; and a ring portion penetrating middle portions of the plurality of leg portions which connects the plurality of leg portions to each other.

In the exemplary embodiment of the present invention, the base bracket may also be coupled to the servo motor and an end portion of the robot through a connection bracket. Additionally, the servo motor may be vertically disposed on the bottom of the connection bracket such that a shaft of the servo motor face is aligned with a central axis of the base bracket. The end portion of the robot may also be coupled to a side surface of the connection bracket 31 such that the shaft of the servo motor is aligned with the shaft of the steering wheel.

In still another embodiment, the machine vision may be disposed on a central portion of the base bracket on the same axis as the servo motor.

In yet another embodiment, the plurality of motor cylinders may be installed at the plurality of leg portions of the base bracket. The grippers may also be moved to at least three places of the steering wheel in order to secure the steering wheel with the grippers spaced at a certain interval in a circumferential direction.

In another aspect, the present invention provides an automated steering wheel leveling method. Initially, a position of a steering wheel is measured using a machine vision, and then a shaft of the steering wheel is aligned with a shaft of a servo motor. Subsequently a motor cylinder moves a plurality of grippers to the steering wheel to secure the steering wheel with the plurality of grippers. Next zero-point data is received from a process PC and the servo motor is rotated accordingly to adjust a zero-point of the steering wheel. The process PC stops the servo motor when the zero-point of the steering wheel is adjusted thereby fixing the steering wheel.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
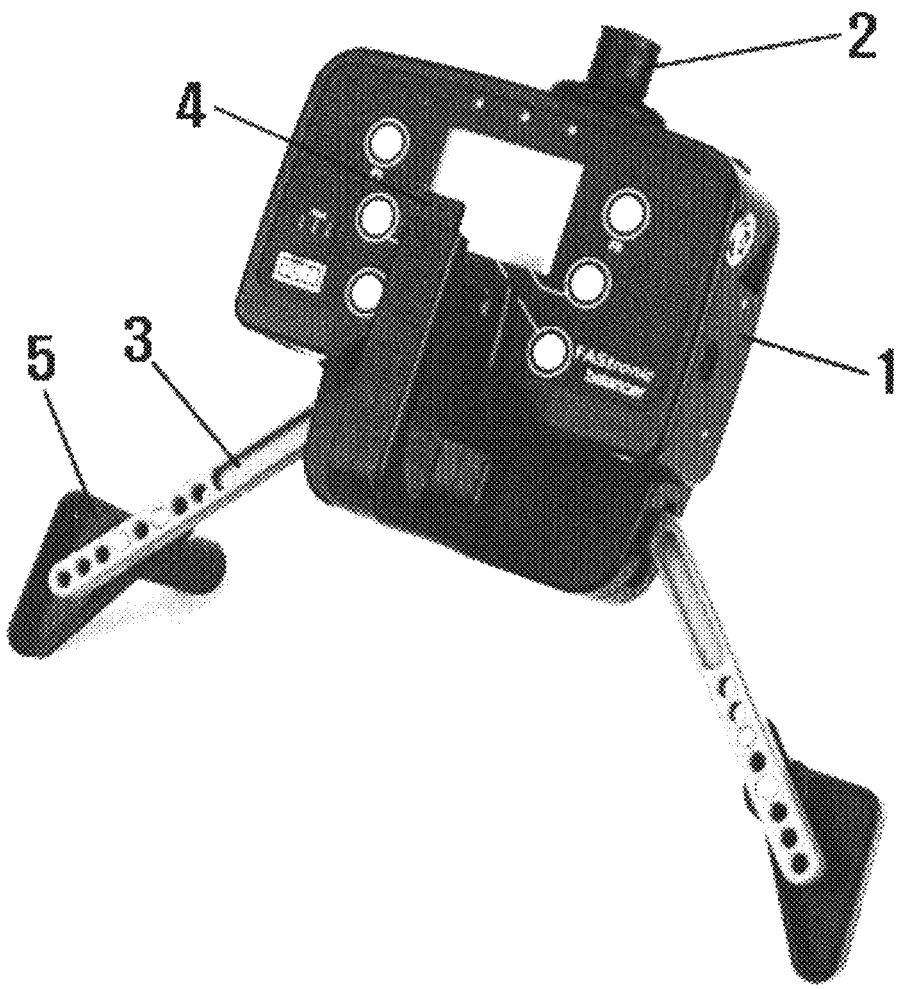
FIG. 1 is a perspective view illustrating conventional a steering wheel leveling apparatus according to a related art.

Reference numerals set forth in the Drawings includes reference to the following elements as further discussed below:

| 10: steering wheel | 11: robot |
| 12: vision/servo motor control PC | 13: robot control unit |
| 14: process PC | 20: automated steering wheel leveling apparatus |
| 21: machine vision | 22: motor cylinder |
| 23: cylinder body | 24: piston rod |
| 25: gripper | 26: base bracket |
| 27: central block | 28: leg portion |
| 29: ring portion | 30: servo motor |
| 31: connection bracket | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 7:
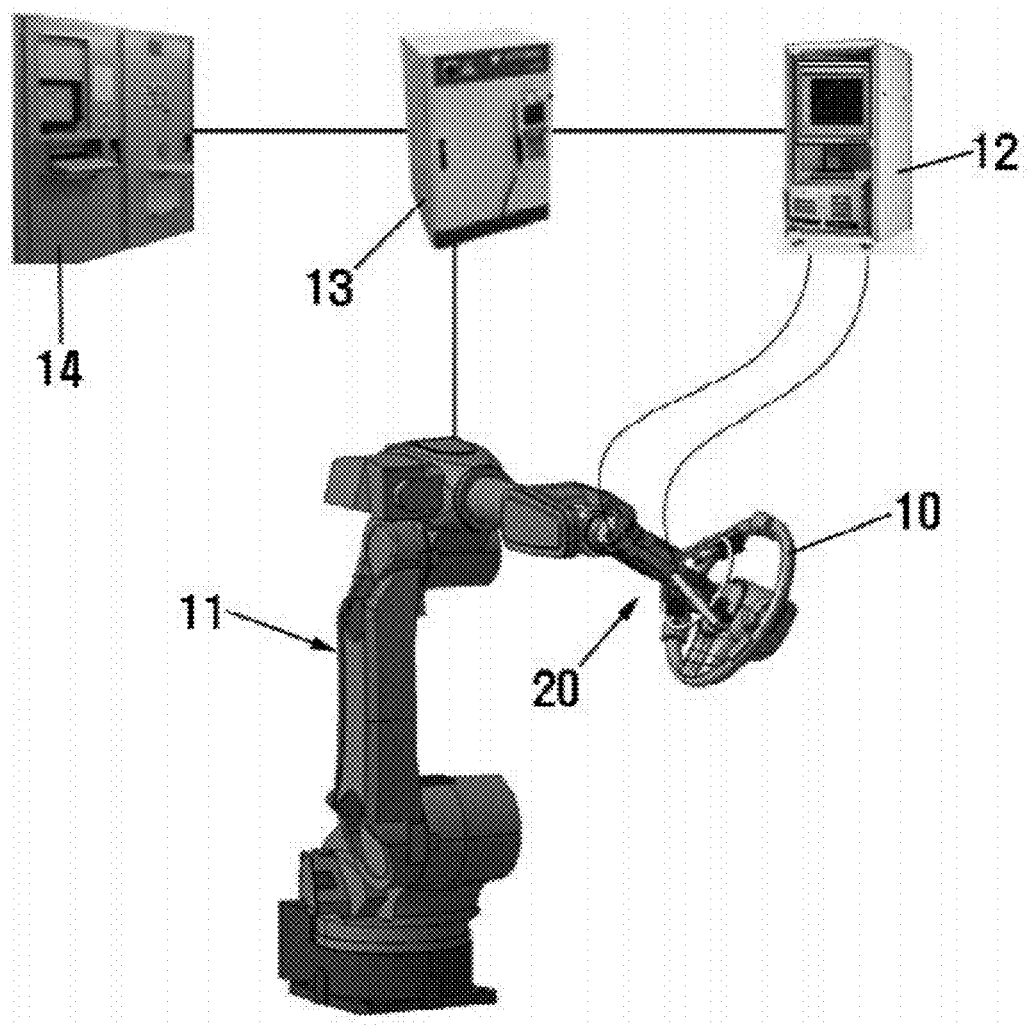
FIG. 7 is a schematic view illustrating an exemplary automated steering wheel leveling system according to an embodiment of the present invention.

FIG. 7 is a schematic view illustrating an automated steering wheel leveling system according to an embodiment of the present invention.

The present disclosure relates to an automated wheel leveling system that can reduce measurement error generated by conventional glass adherence, by performing a zero-point calibration and fixing process by adhering only to a steering wheel 10, but not the window glass of the vehicle.

Figure 4:
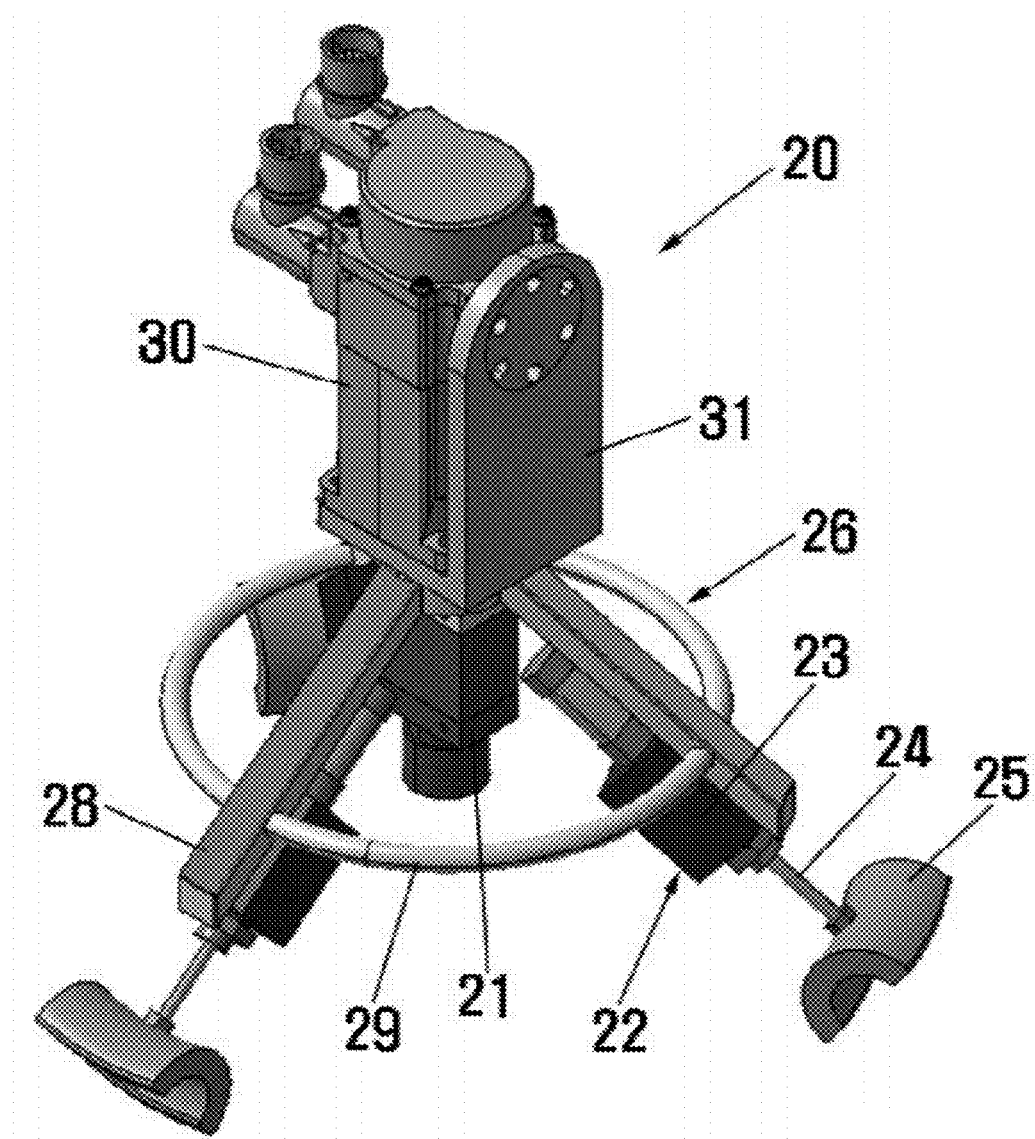
FIG. 4 is a perspective view illustrating an exemplary automated steering wheel leveling apparatus according to an embodiment of the present invention.

FIG. 4 is a perspective view illustrating an exemplary automated steering wheel leveling apparatus according to an embodiment of the present invention. An automated steering wheel leveling apparatus 20 according to an embodiment of the present invention may include a machine vision 21 which photographs the steering wheel 10, a motor cylinder 22 for adhering and fixing grippers 25 to the steering wheel 10, and a servo motor 30 for rotating the steering wheel 10 fixed by the grippers 25 to perform zero-point calibration.

Figure 5:
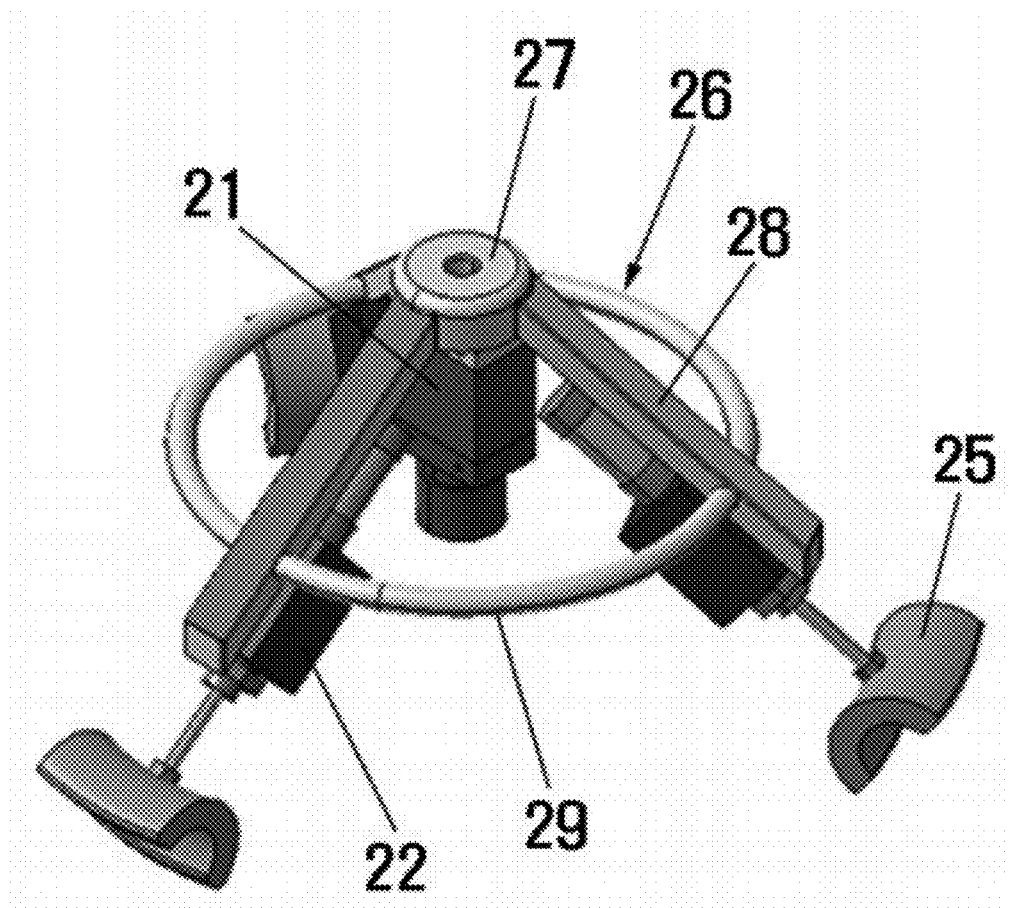
FIG. 5 is a perspective view illustrating an exemplary servo motor detached from the automated steering wheel leveling apparatus of FIG. 4.

In FIG. 5, a perspective view illustrating a servo motor detached from the automated steering wheel leveling apparatus of FIG. 4 is shown. The automated steering wheel leveling apparatus 20 may include a base bracket 26 that allows the machine vision 21, the motor cylinder 22, the servo motor 30, and the robot 11 to be coupled to each other at one point.

The base bracket 26 may have a central block 27 disposed at the center thereof, a ring portion 29 having a ring shape centered on the central block 27 and disposed under the central block 27, and a plurality of leg portions 28 connecting between the central block 27 and the ring portion 29.

Furthermore, a coupling hole may be formed in the center of the central block 27 to hold the servo motor 30. The servo motor 30 may then be coupled through the coupling hole in an axial direction of the servo motor 30 to rotate the whole of the base bracket 26.

Figure 6:
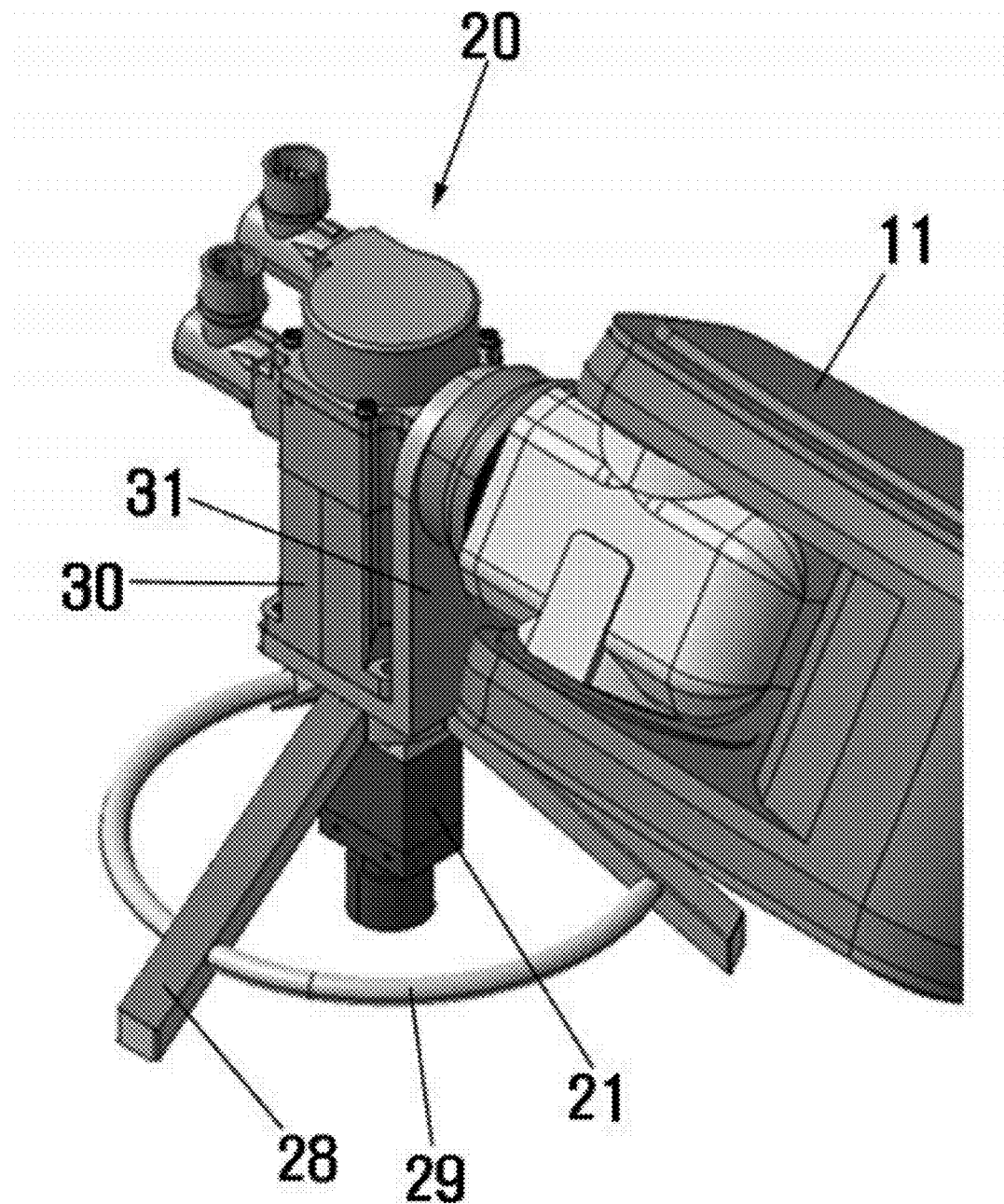
FIG. 6 is a perspective view illustrating an exemplary state where a robot is coupled to a connection bracket of FIG. 4.

In, FIG. 6 a perspective view illustrates an exemplary state where a robot may be coupled to the connection bracket of FIG. 4. Specifically, a connection bracket 31 may be coupled to the upper portion of the central block 27 to thereby be coupled to the robot 11. The connection bracket 31 may, for example, be an L-shaped plate. Coupling holes may be formed in the upper portion of the side surface of the connection bracket 31, and may be arranged in a circular shape at a certain interval so as to provide a connection means to the robot 11. The connection bracket 31 may be coupled to the robot 11 through these coupling holes and coupling means.

Furthermore, the ring portion 29 may be disposed under the central block 27 in a circular shape having a diameter greater than that of the central block 27.

The leg portions 28 of the base bracket 26 may, for example, be disposed at an interval of about 120 degrees in a circumferential direction from each other respectively. The upper portion of the leg portions 28 may be integrally coupled to the circumferential surface of the central block 27, and the lower portion of the leg portions 28 may be increasingly spaced from the leg portions 28 adjacent thereto as it goes downwardly. The middle portion of the leg portions 28 may be penetrated by the ring portion 29 such that the plurality of the leg portions 28 may be connected to each other. Accordingly, the base bracket may have a stable structure with the leg portion 28 and the ring portion 29.

Figure 2:
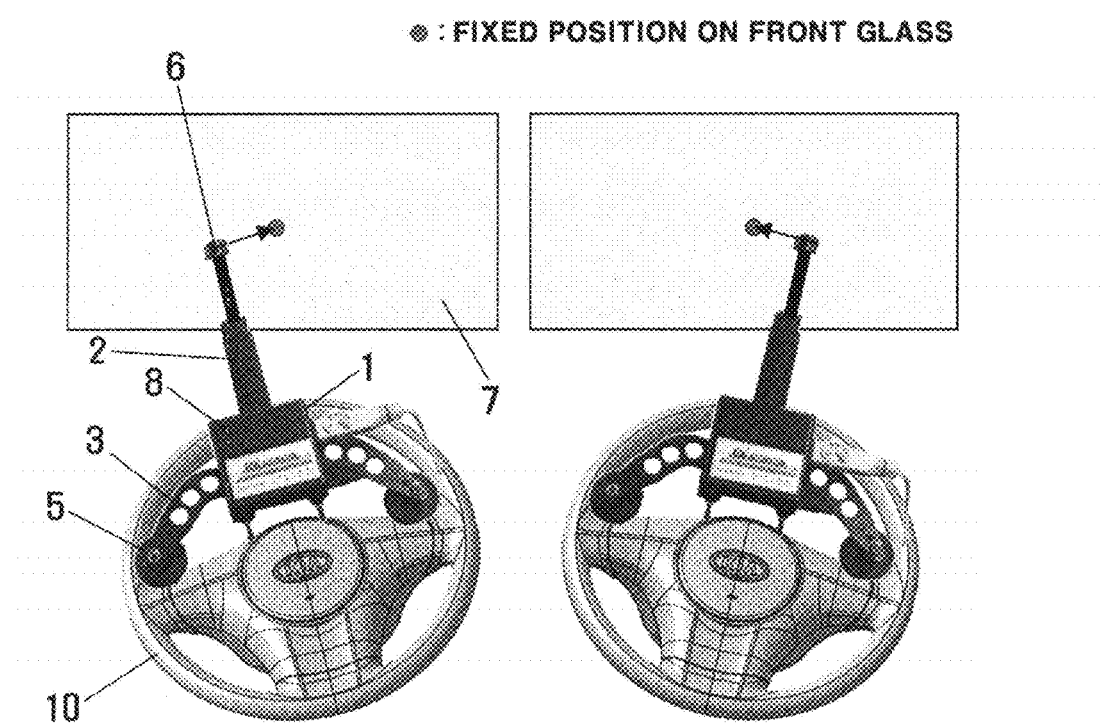
FIG. 2 is a schematic view illustrating a zero-point calibration method used by the conventional steering wheel leveling apparatus of FIG. 1.
Figure 3:
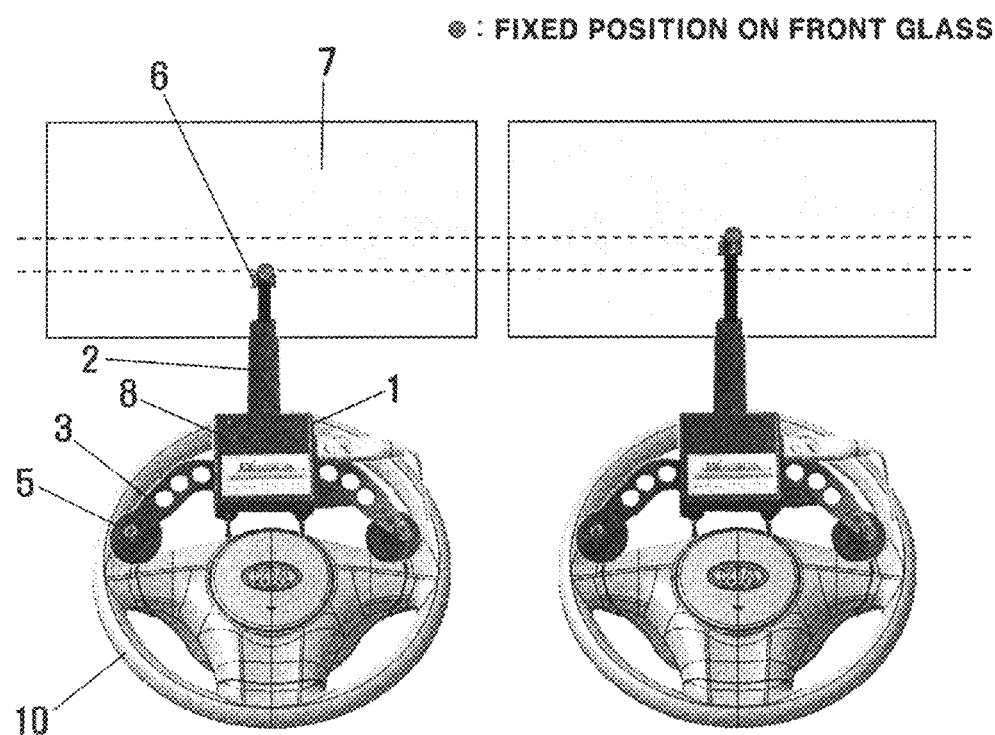
FIG. 3 is a view illustrating a limitation of the conventional steering wheel apparatus of FIG. 1.

Again in reference to FIG. 2, the motor cylinders 22 may be each attached to the leg portions 28 of the base bracket 26. The motor cylinder 22 may have a cylinder body 23 which is attached to the leg portions 28, respectively, by a mounting block, and a piston rod 24 which can be moved in and out of the cylinder body 23.

The cylinder body 23 of the motor cylinder 22 may be disposed the same distance from the shaft of the base bracket 26 in the radial direction, respectively, and may be installed on the leg portions 28 of the base bracket 26. Accordingly, when the piston rod 24 moves out of the cylinder body 23 in the radial direction, the grippers coupled to the piston rods 24 may be fixed on the steering wheel 10, and may flexibly hold steering wheels of various kinds of vehicles by adjusting a stroke of the motor cylinder 22 according to which various steering wheel is being applied.

The grippers 25 may be fixed on at least three places of the steering wheel 10 at a certain interval in the circumferential direction, and may tightly hold the steering wheel 10.

The gripper 25 may have a hemi-cylindrical structure having a curved surface of a semicircle where the under surface thereof is concave. The piston rod 24 may be coupled to the middle portion of the gripper 25 that convexly protrudes, and may project from the cylinder body 23 by the operation of the motor cylinder 22. In this case, the gripper 25 coupled to the end portion of the piston rod 24 may be seated and fixed on the steering wheel 10 to secure the steering wheel 10.

The machine vision 21 is configured to photograph the steering wheel to verify the position information of the steering wheel 10 before the gripper 25 is seated and fixed on the steering wheel 10. The stroke of the motor cylinder 22 and the grip position of the gripper 25 on the steering wheel 10 may then be determined by the position information of the steering wheel 10 obtained using the machine vision 21.

The machine vision 21 may be vertically disposed under the central block 27 that serves as the central axis of the base bracket 26. Accordingly, the position of the shaft of the steering wheel 10 and the grip position of the steering wheel 10 may be exactly verified accordingly.

The servo motor 30 may perform the zero-point calibration for adjusting the steering wheel 10 fixed by the gripper 25 to the center of the vehicle. In this case, the machine vision 21 and the servo motor 30 may be controlled by a control signal from a vision/servo motor control PC 12, as shown in FIG. 7.

The servo motor 30 may be vertically coupled to the connection bracket 31 on the central block 27 of the base bracket 27. As the central block 27 angularly rotates, the whole of the base bracket 26 may angularly rotate about the axis of the servo motor. Accordingly, the steering wheel 10, fixed by the gripper 25, angularly rotates to calibrate the zero-point of the steering wheel 10.

The automated steering wheel leveling system according to an embodiment of the present invention may include the robot 11 to which the automated steering wheel leveling apparatus 20 is coupled through the connection bracket 31, the vision/servo motor control PC 12 that controls the machine vision 21 and the servo motor 30, a robot control unit 13 for controlling the robot 11, and a process PC 14 for controlling overall processes of the wheel alignment.

In this embodiment, the process PC 14 may bi-directionally communicate with the robot control unit 13 and the vision/servo motor control PC 12 to perform integrated control of the machine vision 21 and the servo motor 30 through the robot control unit 13 and the vision/servo motor control PC 12.

The automated steering wheel leveling system may perform the zero-point calibration of the steering wheel 10 using a value measured by the process PC 14, and the robot 11 and the automated steering wheel leveling apparatus 20.

The machine vision 21, may, for example, be a camera. The machine vision may be installed on the under surface of the central block 27 of the base bracket 26, to photograph the appearance of the steering wheel 10 to sent it to the process PC 14.

The vision/servo motor control PC 12 may process the appearance of the steering wheel 10 photographed by the machine vision 21 using high-frequency filtering. The photographed appearance is then generated as target image, processed through the high-frequency filtering, and compared with an already-stored reference image of the steering wheel 10 in order to calculate the position information of the steering wheel 10. The position information of the steering wheel 10 may then be transmitted to the process PC 14 in real-time to be used for position correction.

The robot 11 may rotate various components that are coupled in various axial directions, at various angles according to control signals from the robot control unit 13, and may directly move the automated steering wheel leveling apparatus 20 installed at the end portion of the arm of the robot 11. For example, the robot 11 may move the automated steering wheel leveling apparatus 20 over the steering wheel 10, and photograph the steering wheel 10 using the machine vision 21. Then, an operation of aligning the shaft of the servo motor with the shaft of the steering wheel 10 may be performed using the position information obtained by the machine vision 21.

The servo motor 30 may also receive zero-point data from the process PC 14, and may adjust the angle of the steering wheel 10 to perform the zero-point calibration for adjusting the center of the steering wheel 10 to the center of a vehicle accordingly.

Figure 8:
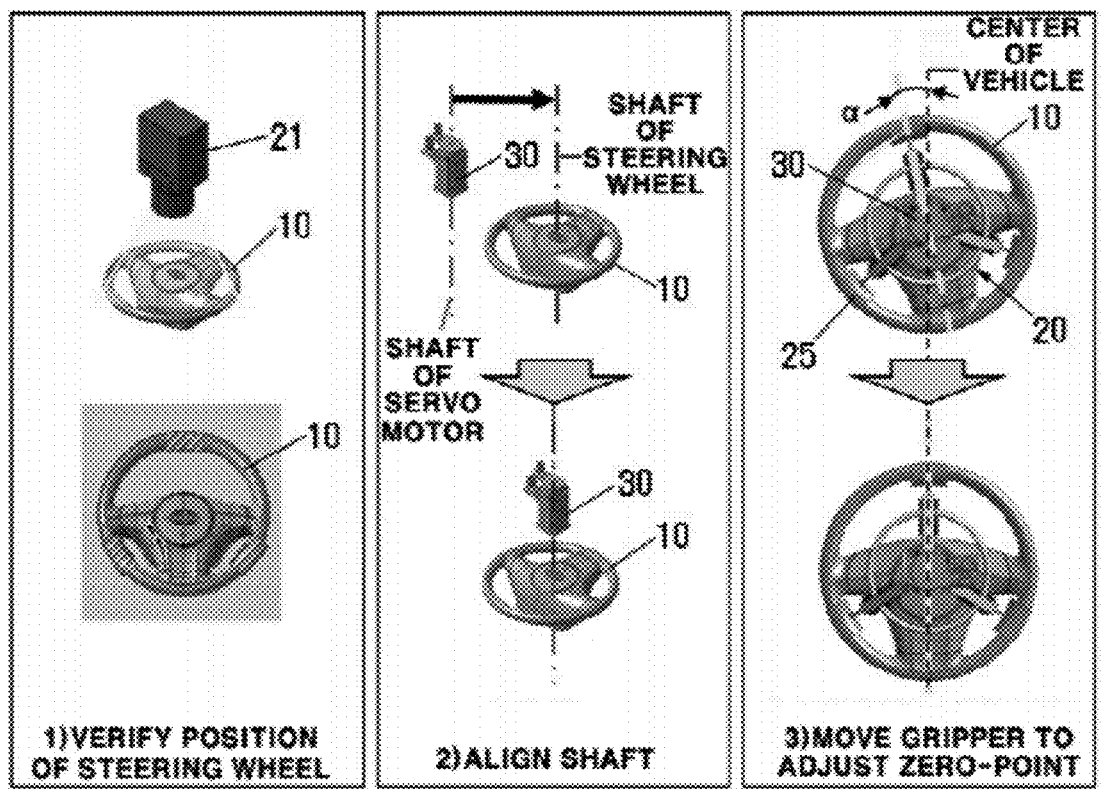
FIGS. 8 and 9 are schematic views illustrating an exemplary zero-point calibration method for an automated wheel leveling system according to an embodiment of the present invention.
Figure 9:
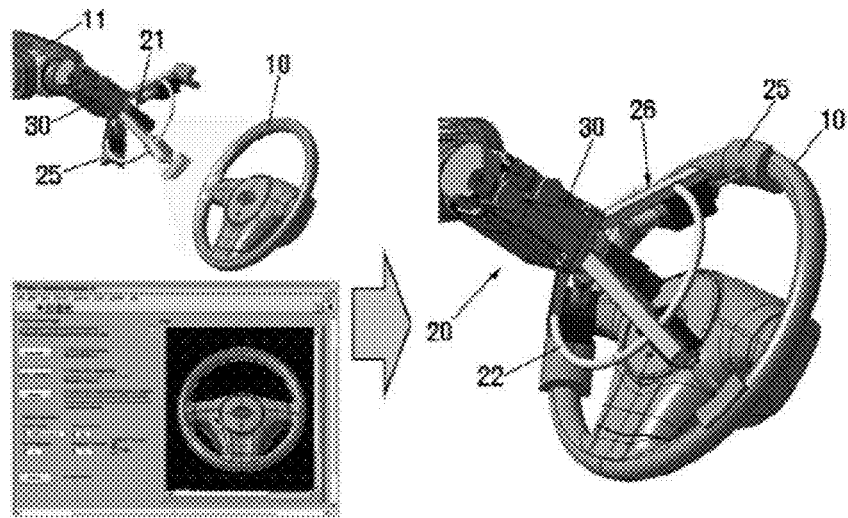
Figure 9:
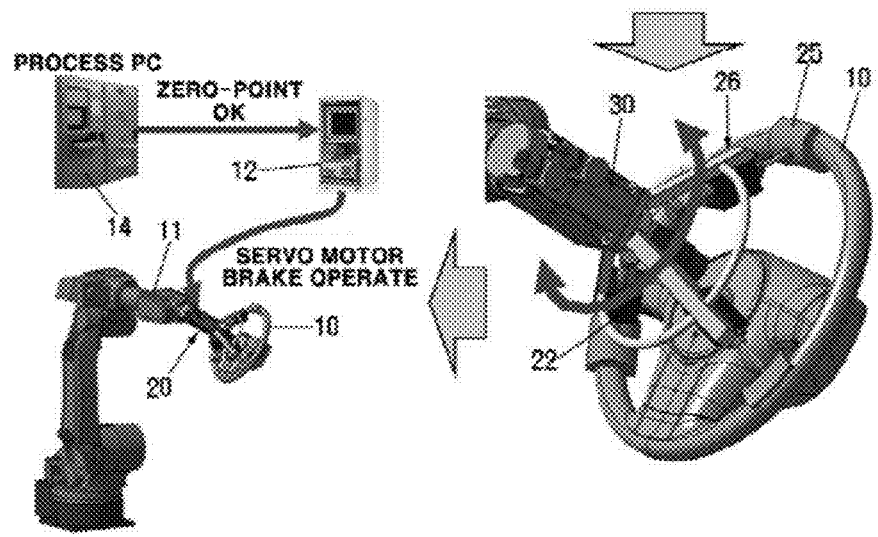

FIGS. 8 and 9 are schematic views illustrating an exemplary zero-point calibration method for an automated wheel leveling system according to an embodiment of the present invention.

In particular, the zero-point calibration for the steering wheel 10 may be automatically performed using the robot 11 and the servo motor 30 instead of being operated by a human operator like in the conventional apparatus shown in FIG. 1.

An automated steering wheel leveling apparatus 20 according to an embodiment of the present invention may be coupled to the connection bracket 31 on the end portion of the arm of the robot 11.

The robot control unit 13 may control the robot 11, and the vision/servo motor control PC 12 may control the machine vision 21 and the servo motor 30. In this embodiment of the present invention, the process PC 14 performs the integrated control of the robot control unit 13 and the vision/servo motor control PC 12 in order to verify the position information of the steering wheel 10 that is measured by the machine vision 21 in real-time and adjust the zero-point using the robot 11 and the automated steering wheel leveling apparatus 20.

In this embodiment of the present invention the robot 11 mounted with the automated steering wheel leveling apparatus 20 moves the machine vision 21 over the steering wheel 10, and then the machine vision 21 photographs the steering wheel 10.

Next, the process PC 14 verifies the position of the shaft of the steering wheel 10 and the grip position of the steering wheel 10 through the machine vision 21.

The process PC 14 may then control the robot 11 using the robot control unit 13 to align the shaft of the servo motor 30 of the automated steering wheel leveling apparatus 20 with the shaft of the steering wheel 10. Thus, the steering wheel 10 may be gripped by the grippers 25, and the zero-point calibration may be performed on the steering wheel 10 to an exact degree of particularity.

When the shaft of the steering wheel 10 is aligned with the shaft of the servo motor 30, the motor cylinder 22 may operate to simultaneously fix the gripper 25 on three places of the steering wheel 10. Thereafter, the servo motor 30 rotates according to the zero-point data received from the process PC 14, and thus may rotate the base bracket 26 that is coupled to the shaft of the servo motor 30.

Finally, when the center of the steering wheel 10 is aligned with the center of the vehicle, the process PC 14 may send a zero-point OK signal to the vision/servo motor control PC 12, and then the vision/servo motor control PC 12 may stop the servo motor 30 to fix the steering wheel 10.

Advantageously, by fixing only the steering wheel with the grippers and performing zero-point calibration and fixing processes of the steering wheel, the zero-point of the steering wheel can be adjusted to a greater degree of exactness. Accordingly, it is possible to prevent error in measurement that may be generated in conventional art because of the non-uniformity of the zero-point of the steering wheel according to the fixed position of a glass adherence portion. In addition, by performing a zero-point calibration by a measured value delivered through a process PC in real-time, and a robot and an automated steering wheel leveling apparatus, the zero-point calibration of the steering wheel can be automated rather than operated by a human user.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An automated steering wheel leveling system, comprising:
    a machine vision photographing a steering wheel to obtain position information of the steering wheel and determine a stroke of a motor cylinder and a grip position of a gripper using the position information;
    a plurality of motor cylinders comprising the gripper at end portions thereof and moving the gripper to steering wheel to secure the steering wheel with the gripper;
    a servo motor rotating the steering wheel secured with the gripper to adjust a zero-point of the steering wheel;
    a robot coupled to a base bracket at an end portion thereof, to which the machine vision, the motor cylinder, and the servo motor are coupled, and moving the machine vision, the motor cylinder, and the servo motor to the steering wheel to align a shaft of the servo motor with a shaft of the steering wheel; and
    a process personal computer (PC) controlling the machine vision, the servo motor, and the robot.

2. The automated steering wheel leveling system of claim 1, wherein the base bracket comprises:
    a central block disposed at a central portion thereof;
    a plurality of leg portions coupled to the central block at an upper end portion thereof, and increasingly spaced from each other closer to a lower end portion thereof; and
    a ring portion penetrating middle portions of the plurality of leg portions to connect the plurality of leg portions to each other.

3. The automated steering wheel leveling system of claim 1, wherein:
    the base bracket is coupled to the servo motor and an end portion of the robot through a connection bracket;
    the servo motor is vertically disposed on the bottom of the connection bracket such that a shaft of the servo motor face is aligned with a central axis of the base bracket; and
    the end portion of the robot is coupled to a side surface of the connection bracket such that the shaft of the servo motor is aligned with the shaft of the steering wheel.

4. The automated steering wheel leveling system of claim 1, wherein the machine vision is disposed on a central portion of the base bracket on the same axis as the servo motor.

5. The automated steering wheel leveling system of claim 2, wherein the plurality of motor cylinders are installed at the plurality of leg portions of the base bracket, and move the grippers to at least three places of the steering wheel to secure the steering wheel with the grippers spaced at a certain interval in a circumferential direction.

6. An automated steering wheel leveling method, comprising:
    measuring a position of a steering wheel using a machine vision, and then aligning a shaft of the steering wheel with a shaft of a servo motor;
    moving, by a motor cylinder, a plurality of grippers to the steering wheel to secure the steering wheel with the plurality of grippers;
    receiving zero-point data from a process personal computer (PC) and rotating the servo motor to adjust a zero-point of the steering wheel; and
    stopping, by the process PC, the servo motor to fix the steering wheel when the zero-point of the steering wheel is adjusted.

7. An automated steering wheel leveling system, comprising:
    a machine vision configured to photograph a steering wheel to obtain position information of the steering wheel, the position information used to determine a stroke of a motor cylinder and at least one grip position of at least one gripper of a plurality of grippers;
    a plurality of motor cylinders comprising at least one gripper of the plurality of grippers at end portions thereof, the plurality of motor cylinders moving the plurality of grippers to the steering wheel to secure the steering wheel with the plurality of grippers;
    a motor rotating the steering wheel secured with the plurality of grippers to adjust a zero-point of the steering wheel;
    a robot coupled to a base bracket at an end portion thereof, to which the machine vision, the plurality of motor cylinders, and the motor are coupled, and moving the machine vision, at least one motor cylinder of the plurality of motor cylinders, and the motor to the steering wheel to align a shaft of the servo motor with a shaft of the steering wheel; and a process personal computer (PC) for controlling the machine vision, the motor, and the robot.

8. The automated steering wheel leveling system of claim 7, wherein the base bracket comprises:

a central block disposed at a central portion thereof;

a plurality of leg portions coupled to the central block at an upper end portion thereof, and increasingly spaced from each other closer to a lower end portion thereof; and a ring portion penetrating middle portions of the plurality of leg portions to connect the plurality of leg portions to each other.

9. The automated steering wheel leveling system of claim 8, wherein the plurality of motor cylinders are installed at the plurality of leg portions of the base bracket, and plurality of motor cylinders move the grippers to at least three places of the steering wheel to secure the steering wheel with the grippers spaced at a certain interval in a circumferential direction.

10. The automated steering wheel leveling system of claim 7, wherein:

the motor is a servo motor;

the base bracket is coupled to the servo motor and an end portion of the robot through a connection bracket;

the servo motor is vertically disposed on the bottom of the connection bracket such that a shaft of the servo motor face is aligned with a central axis of the base bracket; and the end portion of the robot is coupled to a side surface of the connection bracket such that the shaft of the servo motor is aligned with the shaft of the steering wheel.

11. The automated steering wheel leveling system of claim 7, wherein the machine vision is disposed on a central portion of the base bracket on the same axis as the servo motor.

* * * * *